(12) United States Patent
Yamada et al.

(10) Patent No.: US 7,254,312 B2
(45) Date of Patent: Aug. 7, 2007

(54) DIGITAL BROADCAST TRANSMITTER, RECEIVER AND METHOD OF RECEIVING THEREOF

(75) Inventors: Masahiro Yamada, Gunma-ken (JP); Noriya Sakamoto, Kanagawa-ken (JP); Atsushi Hirota, Kanagawa-ken (JP)

(73) Assignee: Kabushiki Kaisha Toshiba, Kanagawa-Ken (JP)

( * ) Notice: Subject to any disclaimer, the term of this patent is extended or adjusted under 35 U.S.C. 154(b) by 1126 days.

(21) Appl. No.: 09/794,216

(22) Filed: Feb. 28, 2001

(65) Prior Publication Data

US 2001/0038744 A1 Nov. 8, 2001

(30) Foreign Application Priority Data

Feb. 29, 2000 (JP) ............................. 2000-054591

(51) Int. Cl.
*H04N 5/91* (2006.01)
(52) U.S. Cl. ........................................ 386/94; 386/125
(58) Field of Classification Search ................ 386/35, 386/40, 66, 83, 94, 124, 125
See application file for complete search history.

(56) References Cited

U.S. PATENT DOCUMENTS

| | | | |
|---|---|---|---|
| 4,908,859 A | | 3/1990 | Bennett et al. |
| 4,945,563 A | * | 7/1990 | Horton et al. .................. 725/2 |
| 5,629,980 A | * | 5/1997 | Stefik et al. ................... 705/54 |
| 5,796,828 A | * | 8/1998 | Tsukamoto et al. ......... 380/203 |
| 5,799,081 A | | 8/1998 | Kim et al. |
| 5,838,873 A | | 11/1998 | Blatter et al. |
| 5,862,299 A | | 1/1999 | Lee et al. |
| 5,907,656 A | * | 5/1999 | Oguro ........................... 386/94 |
| 6,163,644 A | | 12/2000 | Owashi et al. |
| 6,487,543 B1 | | 11/2002 | Ozaki et al. |
| 6,694,022 B1 | | 2/2004 | Matsushita |
| 6,853,728 B1 | * | 2/2005 | Kahn et al. .................... 386/94 |
| 2003/0133699 A1 | * | 7/2003 | Ando et al. .................... 386/95 |

FOREIGN PATENT DOCUMENTS

| | | |
|---|---|---|
| EP | 0 831 648 A3 | 3/1998 |
| EP | 0831648 A2 * | 3/1998 |
| EP | 0 954 173 A1 | 11/1999 |
| EP | 0 989 557 A1 | 3/2000 |
| JP | 7-30446 | 1/1995 |
| JP | 8-336125 | 12/1996 |
| JP | 9-191453 | 7/1997 |
| JP | 10-13808 | 1/1998 |
| JP | 10-191232 | 7/1998 |
| JP | 11-205707 | 7/1999 |
| JP | 11-308593 | 11/1999 |
| JP | 11-308595 | 11/1999 |
| JP | 2000-57686 | 2/2000 |
| JP | 2000-78515 | 3/2000 |
| JP | 2003-298876 | 10/2003 |

* cited by examiner

*Primary Examiner*—Thai Q. Tran
*Assistant Examiner*—James A. Fletcher
(74) *Attorney, Agent, or Firm*—Pillsbury Winthrop Shaw Pittman, LLP

(57) ABSTRACT

A receiver for the digital broadcasts with which an appropriate copy regulation is executed for a temporal recording. Regarding the temporal recording of the programs of the digital broadcasts, either of the signals of the system including at least the signals, which represent "recording permitted" or "recording prohibited", is received as the temporal record control data and the record control is executed in accordance with the temporal record control data to execute the temporal recording of the received broadcast program or not to execute the temporal recording.

15 Claims, 17 Drawing Sheets

| DIGITAL COPY REGULATION DESCRIPTOR | MEANING |
|---|---|
| 00 | COPY PERMITTED UNCONDITIONALLY (& ONLY TEMPORAL RECORDING PERMITTED) |
| 01 | COPY PROHIBITED (& ONLY TEMPORAL RECORDING PERMITTED) |
| 10 | SINGLE COPY PERMITTED (& ONLY TEMPORAL RECORDING PERMITTED) |
| 11 | COPY PROTECTED (& ONLY TEMPORAL RECORDING PROHIBITED) |

FIG. 3

| VIDEO RECORD CONTROL DATA | MEANING |
| --- | --- |
| 0x00 | VIDEO RECORDING PROHIBITED (& TEMPORAL RECORDING PROHIBITED) |
| 0x01 | VIDEO RECORDING PERMITTED FOR SUBSCRIBER ONLY (&TEMPORAL RECORDING PROHIBITED) |
| 0x02 | VIDEO RECORDING PROHIBITED (& TEMPORAL RECORDING PERMITTED) |
| 0x03 | VIDEO RECORDING PROHIBITED (& TEMPORAL RECORDING PERMITTED FOR SUBSCRIBER ONLY) |
| 0x04 | VIDEO RECORDING (& TEMPORAL RECORDING PERMITTED FOR SUBSCRIBER ONLY) |
| 0x10 | VIDEO RECORDING PERMITTED (& TEMPORAL RECORDING PERMITTED) |

FIG. 7

| DATA STRUCTURE | NUMBER OF BITS | BIT STRING NOTATION |
|---|---|---|
| temporal_digital_record_control_descriptor () { | | |
|   descriptor_tag | 8 | uimsbf |
|   descriptor_length | 8 | uimsbf |
|   temporal_digital_recordability_flag | 1 | bslbf |
|   num_of_replay | 4 | bslbf |
|   over_process_control | 3 | bslbf |
|   if (over_process_control == '011') { | | |
|     partial_replay_unit | 24 | uimsbf |
|     partial_replay_on_time | 24 | uimsbf |
|     partial_replay_off_time | 24 | uimsbf |
|   } | | |
| } | | |

FIG. 10a

| temporal_digital_recordability_flag | MEANING |
|---|---|
| '0' | TEMPORAL RECORDING PROHIBITED |
| '1' | TEMPORAL RECORDING PERMITTED |

FIG. 10b

| over_process_control | MEANING |
|---|---|
| '000' | DELETION OF THE TEMPORAL RECORDED PROGRAM DATA |
| '001' | REPLAY OF TEMPORAL RECORDED PROGRAM PROHIBITED |
| '010' | REPLAY OF TEMPORAL RECORDED PROGRAM LIMITED IN TIME |
| '011 - 111' | RESERVED |

FIG. 10c

| DATA STRUCTURE | NUMBER OF BITS | BIT STRING NOTATION |
|---|---|---|
| digital_copy_control_descriptor () { | | |
|     descriptor_tag | 8 | uimsbf |
|     descriptor_length | 8 | uimsbf |
|     digital_recording_control_data | 2 | bslbf |
|     maximum_bit_rate_flag | 1 | bslbf |
|     component_control_flag | 1 | bslbf |
|     copy_control_type | 2 | bslbf |
|     if(copy_control_type==01)){ | | |
|         APS_control_data | 2 | bslbf |
|     } | | |
|     else{ | 2 | bslbf |
|         reserved_future_use | | |
|     } | | |
|     if( maximum_bit_rate_flag == 1 ) { | | |
|         maximum_bit_rate | 8 | uimsbf |
|     } | | |
|     if( component_control_flag ==1 ){ | | |
|         component_control_length | 8 | uimsbf |
|         for(i=0;i<N;i++){ | | |
|             component_tag | 8 | uimsbf |
|             digital_recording_control_data | 2 | bslbf |
|             maximum_bitrate_flag | 1 | bslbf |
|             reserved_future_use | 1 | bslbf |
|             copy_control_type | 2 | bslbf |
|             if(copy_control_type==01) { | | |
|                 APS_control_data | 2 | bslbf |
|             } | | |
|             else{ | | |
|                 reserved_future_use | 2 | bslbf |
|             } | | |
|             if(maximum_bitrate_flag==1){ | | |
|                 maximum_bitrate | 8 | uimsbf |
|             } | | |
|         } | | |
|     } | | |
| } | | |

FIG. 14

| DIGITAL COPY REGULATION DESCRIPTOR | MEANING |
|---|---|
| 00 | COPY PERMITTED UNCONDITIONALLY |
| 01 | PROVIDER-CONDITIONING COPY |
| 10 | SINGLE COPY PERMITTED |
| 11 | COPY PROTECTED |

FIG. 15

| VIDEO RECORD CONTROL DATA | MEANING |
|---|---|
| 0x00 | VIDEO RECORDING PROHIBITED |
| 0x01 | VIDEO RECORDING PERMITTED FOR SUBSCRIBERS ONLY |
| 0x10 | VIDEO RECORDING PERMITTED |

FIG. 16

DIGITAL BROADCAST TRANSMITTER, RECEIVER AND METHOD OF RECEIVING THEREOF

FIELD OF THE INVENTION

The present invention relates to a method for receiving digital broadcast programs, and more particularly, to a method for managing a temporal recording of received digital broadcast programs and an apparatus employing the method.

BACKGROUND OF THE INVENTION

In general, in case of digital broadcastings, control data for permission/prohibition of copying the broadcast programs are often transmitted as a program related data together with the video and audio data streams and the like which composing the programs. The transmitted copy regulation data are used for determining permission/prohibition of recording the program at the time of the program recording by a recorder such as D-VHS VCRs.

As an example of the copy regulation data, FIG. 14 shows a syntax structure of the digital copy regulation descriptor described in "ARIB STD-B10, Issue No. 1.2", which defines the program sequence data used for the digital broadcasts such as the BS or CS broadcast in Japan. In the syntax structure there is a 2-bit field so-called "digital_recording_control_data", which describes a copy generation control data. As shown in FIG. 15, these 2-bit fields data. "00", "01", "10" and "11" represent "unconditionally copy permitted", "provider-conditioning copy", "single copy permitted" and "copy protected", respectively.

Also, in case of the limited reception programs, a program control data is included in the ECM (Entitlement Control Message) to be transmitted. And then a record control data for permission/prohibition of recording the program may be included in the ECM. According to "ARIB-STD-B25, Issue No 1.0" which defines a limited reception system for BS digital broadcasts in Japan, as a response of the subscription checking command, which is one of the command/response between an IC card according to ECM and IRD, there is a video record control field (8-bit). 3-bit fields including therein one bit of the video record control field, as shown in FIG. 16, represents "video recording prohibited", "video recording permitted for subscribers only", and "video recording permitted". Based on these data, a permission/prohibition of recording the program in interest is determined by the receiver and then the process is executed.

By the way, in these days there is a time shift TV replay as an item of the promising functions in case that an accumulating media is provided on a receiver, which is randomly accessible to the media such as hard disc. The time shift TV replay is, as shown in FIG. 17, a function that enables TV replay while replaying a program from its beginning at an arbitrary time while the program on air is recorded. In this example, when a TV viewer has reserved a recording of program A from 8:00 PM, he can start the TV replay at any time, for example, from 8:30 PM, without waiting until the end of the program at 9:30 PM.

This time shift TV replay can be accomplished, if a temporal recording is possible without relying upon a long-lasting recording of the program. Also, this can be accomplished as this is different from a normal recording of the program, even if the replay is limited to a certain extent, for example, there is a limitation for such as a period allowed for replays or the maximum number of replays.

In the meantime, as described above, according to the subscription checking data on the copy regulation data and ECM, if the recording is permitted, the replay is also possible without limitation. While in case of "copy-protected" a TV replay is permitted only in a real time manner. For this reason, in the case of a function that has assumed a temporal recording/temporal replay, such as the time shift TV replay, it is accomplished only in case that the program is permitted for recording. Thus not only intentions of the contents-provider cannot be fully reflected, but also the interest of the TV viewers will be limited.

As described above, in case that feasible features in a temporal recording/temporal replay such as a time shift TV replay will be provided in receivers, such features had accomplished only for programs permitted their recording and capable of replay without limitation in the conventional system. Thus there were problems such as that the intention of the contents-provider cannot be reflected fully, so that the interest of the TV-viewer had been limited.

As described above, as to the program for the digital broadcasts, in case of the conventional copy regulation method, which controls recordings of video/audio data, there was no copy regulations for the temporal recording for the sake of the time shift TV replay. Therefore, there were problems that appropriate copy regulations acceptable to both of the contents-provider and the TV-viewer were not executed.

SUMMARY OF THE INVENTION

Therefore, it is an object of the present invention to provide a transmitter for the digital broadcasts, a receiving method and a receiver, wherein an appropriate copy regulation can be executed for a temporal recording.

In order to accomplish the above-mentioned object, according to the principal aspect of the present invention, a receiver which executes a record control of the digital broadcasts can be provided, wherein any signal is received as temporal record control data either signal of the system, which includes signals that mean at least "recording permitted" and "recording prohibited" as to a temporal recording of a programs of the digital broadcasts, which manages permission/prohibition of temporal recording of the received broadcast program according to the temporal record control data.

Therefore, in accordance with the present invention, an appropriate copy regulation can be executed for the temporal recording.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a table for explaining an example of the meaning of copy regulation data for digital broadcasts in accordance with an embodiment of the invention.

FIG. 7 is a table for explaining an example of the meaning of record control data in accordance with another embodiment of the invention;

FIGS. 10a-10c are tables for explaining examples of the temporal record control descriptors in accordance with still another embodiment of the invention;

FIG. 14 is a table for explaining an example of the syntax structure for the digital copy regulation descriptor in prior arts;

FIG. 15 is a table for explaining an example of the digital copy regulation data in prior arts;

FIG. 16 is a table for explaining an example of the video record control data of the limited reception of broadcast in prior arts.

DESCRIPTION OF THE PREFERRED EMBODIMENTS

Hereinafter, preferred embodiments of the present invention will be described in reference to the accompanying drawings, FIGS. 1 to 14.

First Embodiment

The first embodiment presents a system wherein a signal for indicating possibility/impossibility of the temporal recording for programs is transmitted from a transmitter by using program sequence data, i.e., a digital copy regulation descriptor, while programs permitted a temporal recording undergoes limitations of the time shift replay span.

As the program sequence data, either of a PMT (Program Map Table), an EIT (Event Information Table) and an SDT (Service Definition Table) can be used.

Figure 1:
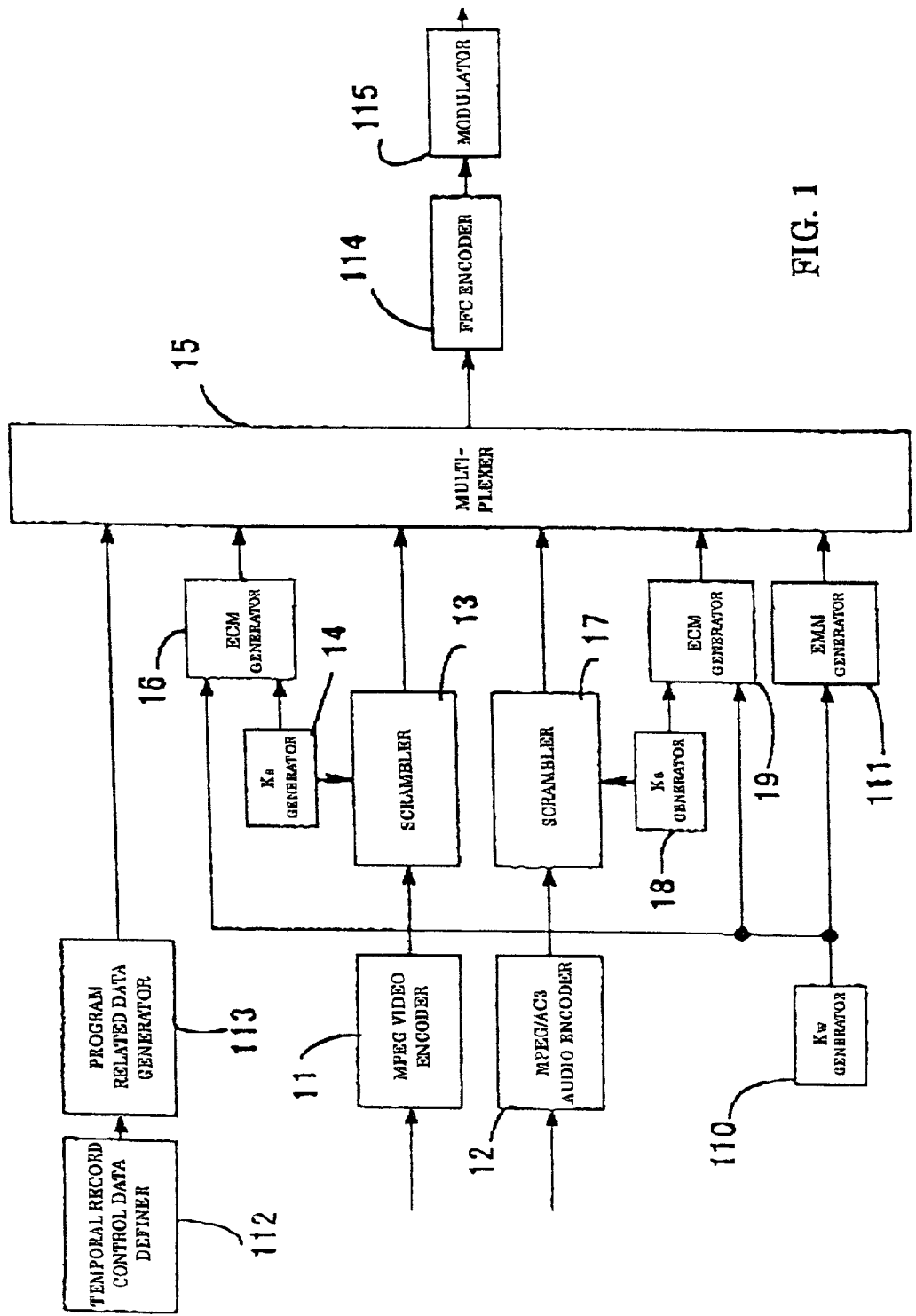
FIG. 1 is a block diagram showing an example of constitution of a transmitter in accordance with an embodiment of the invention.

FIG. 1 shows an example of the basic configurations for the digital broadcasting transmitter according to the present embodiment.

The transmitter is comprised of an MPEG video encoder 11 for encoding video and audio signals, an MPEG/AC3 audio encoder 12, scramblers 13, 17 for scrambling the encoded video and audio signals, a scramble key (Ks) generators 14, 18 for generating scramble keys for video and audio signals, a work key (Kw) generator 110 for generating work keys used for encrypting the scramble keys, an EMM (Entitlement Management Messages) generator 110 for generating EMMs (Entitlement Managing Messages) by encrypting outputs from the work key generator 110, ECM (Entitlement Control Message) generators 16, 19 for generating ECMs by encrypting the scramble keys and the work Keys respectively, a temporal record control data definer 112 for defining the temporal record control data, a program related data generator 113 for generating the program related data, multiplexer 15 for multiplexing those data, an FFC encoder 114 for executing error correction coding on the multiplexed signals, and a modulator 115 for modulating the coded signals.

The signals of video and audio for the digital broadcast are supplied to an MPEG video encoder 11 and an MPEG/AC 3 audio en encoder 12 respectively. The video signal is encoded by the MPEG video encoder 11 and is supplied to a scrambler 13. At the scrambler 13, the video signals coded according to the scramble keys generated by a scramble key generator 14 are processed for scrambling and are supplied to the multiplexer 15.

Meantime, the scramble key generated by the scramble key generator 14 is also supplied to ECM generator 16, generates ECM by encrypting and supplied to the multiplexer 15 as common data.

Similarly, the audio signals are supplied to the multiplexer 15 through a scrambler 17. Also, as to the scramble key, the keys generated by the scramble key generator 18 are used and ECM are generated and encrypted in the ECM generator 19 and are supplied to the multiplexes 15.

Furthermore, the work keys used for the encrypting these scramble keys are generated in the work key generator 110 and are encrypted in the EMM generator 111 to generate EMM, which are supplied to the multiplexer 15 as individual data.

Now, the temporal record control data for the program are defined in the temporal record control data definer 112, and are supplied to the program related data generator 113. At the program related data definer 112, the same data and other program related data are converted into descriptors, and further to the transferring format so-called "section" and are supplied to the multiplexer 15.

Now, an example of the case that a copy regulation data regarding the temporal recording are also defined in the digital copy regulation descriptor is shown in FIG. 3. At the digital copy regulation data (2-bit data) of the same descriptors, "01" which corresponds to provider-conditioning copy is defined as "coping is prohibited and a temporal recording only is permitted".

Also in order to ensure the conformity with the previous definition regarding other values, it shall be defined so as to be understood as follows: in case of the "copy-permitted" the temporal recording is also permitted, and in case of the "copy-protected" the temporal recording is also prohibited.

Further, in the multiplexer 15, each input stream is allocated with an identifier so-called PID (Packet ID), divided into a packet in fixed length of 188 bites and multiplexed, and is as a transport stream (hereinafter abbreviated to TS) supplied to FEC (error correcting) encoder 114.

The FEC encoder 114 encodes TSs supplied thereto by a convolution coding such as the Viterbi-coding or RS (Read-Solomon) coding. The encoded data are then supplied to a modulator 115. In the modulator 115 a digital modulation such QAM or QPSK is executed. Then the digital data are converted to analog signals and further converted to high frequency (RF) signals for outputting as broadcast signals.

Figure 2:
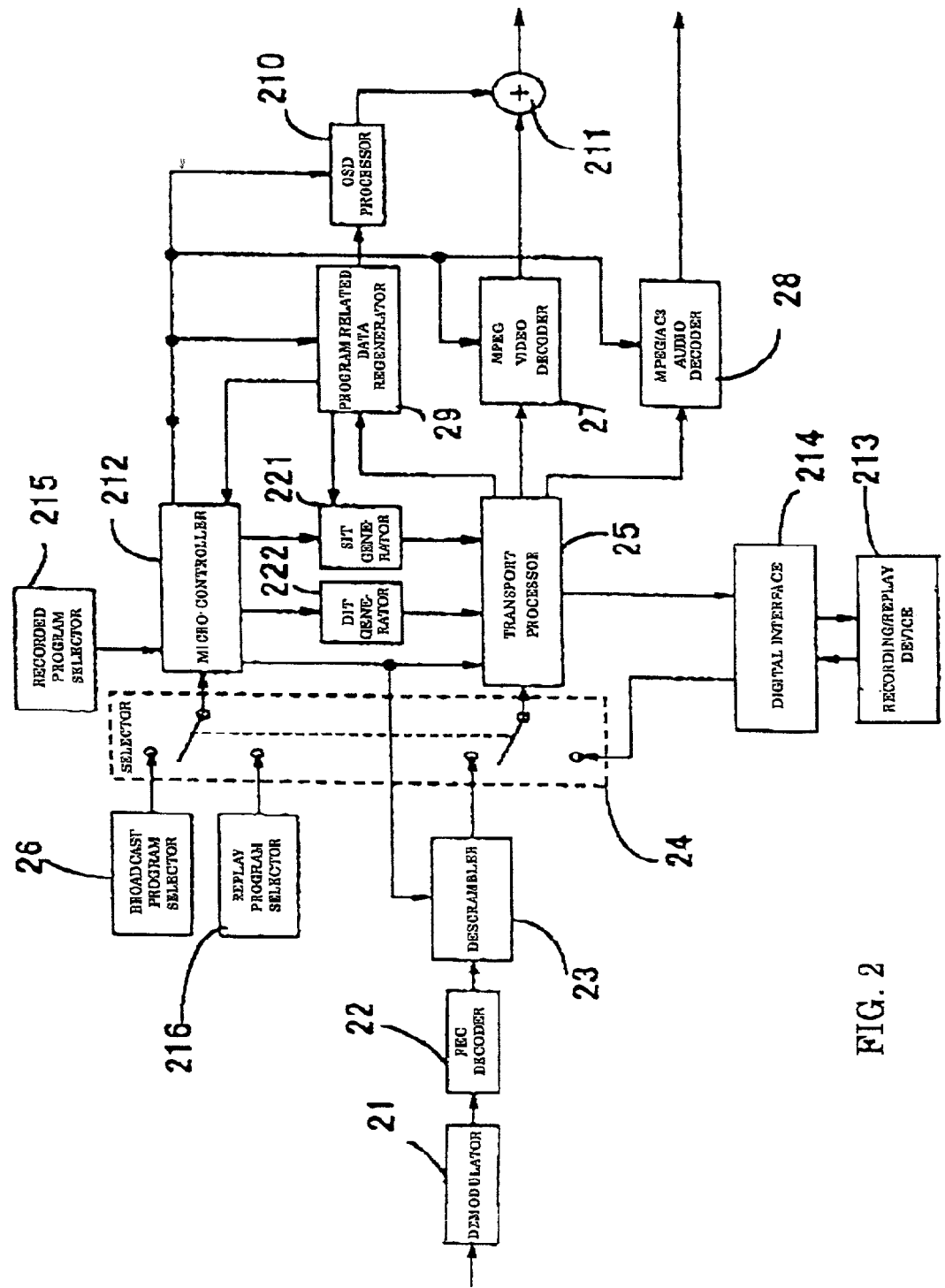
FIG. 2 is a block diagram showing an example of constitution of a receiver in accordance with an embodiment of the invention.

Now, an example of a basic configuration of the receiver for the digital broadcasts transmitted (hereinafter so-called IRD) by the aforementioned transmitter is shown in FIG. 2.

The high frequency digital signals input from the antenna terminal are inputted through a tuner into the demodulator 21. In the demodulator 21, the signals are A/D converted and then the digital modulated signals are demodulated, for example, on the transmitter side such as QAM or QPSK, and are supplied to the FEC (error correcting) decoder 22.

At the FEC decoder 22, the signals which have been encoded by the convolution encoding such as the Viterbi-encoding or encoded by the RS (Read-Solomon)-encoding are decoded and then supplied to the descrambler 23. At the descrambler 23, the scrambled signal of video and audio of the designated program is descrambled according to the scramble key, and is out putted to the transport processor 25 through the selector 24.

At the transport processor 25, the predetermined service is selected by a broadcast program-selector 26 such as remote controller among, generally, as plurality of the programs which have been multiplexed on the from of TS. The signals of video and audio composing the program are separated by a multiplex-processor and demultiplexed. The respective signals of video and audio are reversed to the respective compressed signals, and are supplied to the MPEG video decoder 27 and the MPEG/AC3 audio decoder 28.

At the transport processor 25, the program related data such as PSI (Program Specific Information) and SI (Service Information), which are multiplexed together with the video and audio, are separated and then supplied to the program related data regenerator 29.

And, in the MPEG video decoder 27, while the decoded video frame is stored in the DRAM (not shown), the signals, which have been encoded by means of MPEG2 video high efficiency coding system, is decoded into the forms of digital color component signals Y, Cb and Cr. These color component signals are then multiplexed with a graphic output from an on-screen display (OSD) processor 210 in an adder 211, if desired.

The audio signals are output after decoding in the MPEG/AC3 audio decoder 28.

Meantime, when this IRD outputs analog data, the output of the video from the adder 211 (not shown) is output, for example, by converting into NTSC-analog composite signals, through an NTSC encoder. Also the output from the MPEG/AC3 audio decoder 28 is supplied to the audio D/A converter and is output as analog audio signal.

In order to appropriately execute these signal processings, a micro-controller 212 is provided. The micro-controller 212 also supports peripheral devices. At the micro-controller 212, for example, in accordance with the service designations input from the broadcast program selector 26, the PSI data regenerated in the program related data regenerator 29 are analyzed, and then the respective transfer-identifiers such as video and audio signal composing the specified service (program) are set in the transport processor 25.

Also, the related data necessary for descrambling process is analyzed and this PID is set in the descrambler 23. Furthermore, the operations in the peripheral devices such as the MPEG video decoder 27, the MPEG/AC3 audio decoder 28, the program related data regenerator 29 and the OSD processor 210 are controlled. Especially, the micro-controller 221 instructs the OSD processor 210 to display the EPG (Electronic Program Guide), while the data maintained and managed in the program related data regenerator 29 are processed and edited as the case may be.

In the meantime, in the IRD, the recording/replay device 213 is connected by means of a digital interface 214.

When a start time for recording a specific service program is designated among the multiplexed signals of the digital broadcasts under reception, by means of the recorded program selector 215 such as a remote controller, the micro-controller 212, which has received the instruction, analyzes the designated program related data, same as in the case of a real time replay of broadcast programs, and the respective transmission identifiers are defined in the transport processor 25 and the descrambler 23. As a result, the transport processor 25 demultiplexes the necessary data and outputs to the recording/replay device 213 through the digital interface 214.

Meantime DVB specifies that, when program(s) are selected and recorded (the stream of the recorded program is so-called a partial TS), the accumulated related data so-called SMI (Storage Media interoperability Table) shall be prepared in the IRD and shall be inserted instead of the SI.

In the SMI there are two tables: a SIT (Selection Information Table), which describes the data of the programs recorded and selected, and a DIT (Discontinuity Information table), which describes the discontinuity of the data of SI.

The SIT is prepared by extracting and editing the data regarding the programs and/or services recorded and selected from the SI which are multiplexed in the broadcast signals by means of the SIT generator 221, and are multiplexed into the recording signals in the transport processor 25.

Also, the DIT is inserted into the record stream, when SI data may become discontinuous in the DIT generator 222, as the data indicating the discontinuity.

In case of replay processing, both of the selector 24 and the recorded program selector 215 selects and outputs the input from the record replay processing side. At the transport processor 25, same as in the case of broadcast reception replay, a certain specified service is selected by a replay program selector 216 such as a remote controller among the multiplexed signals in the form of TS, and the video and audio signals composing the program are multiplex-processed, demultiplexed and then returned to the respective compressed signals, which are supplied to the MPEG video decoder 17 or PEG/AC audio decoder 28. Also the program related data such as PSI and SIT which are multiplexed together with video and audio data are also separated and then supplied to the program related data regenerator 29.

Now, the record control process and the playback control process in the IRD are described in detail hereinafter.

Figure 4:
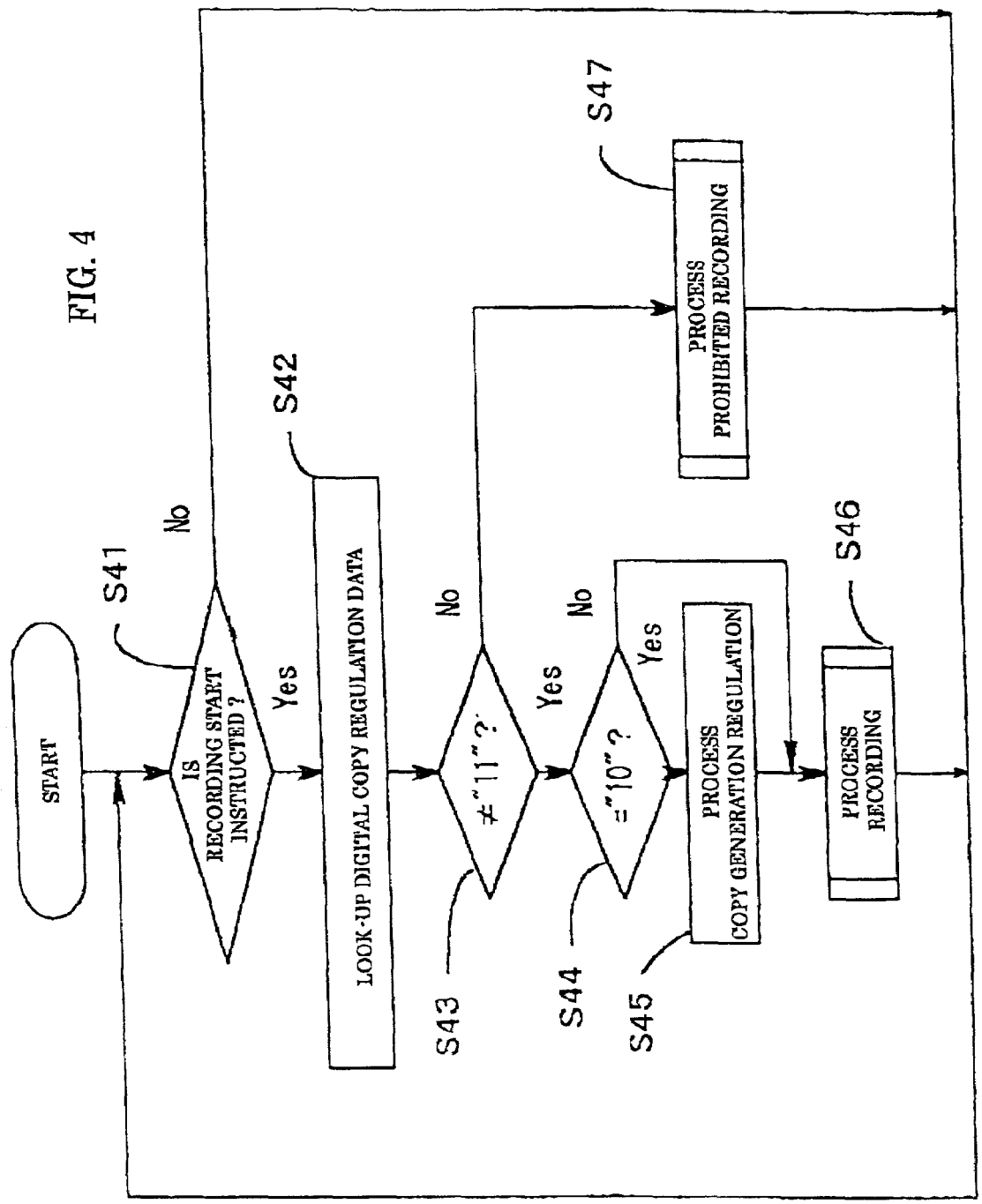
FIG. 4 is a flowchart for explaining the interpretation procedure for the record control in accordance with an embodiment of the invention.

Regarding the recording process, the micro-controller 212 as mentioned above in relation to the control of the record in the sequence, as shown in FIG. 4.

At first, if it is determined that an instruction for the recording start is received at the step S41, the process goes to the step S43 by looking up the digital copy regulation data at the step S42. If the value of the digital copy regulation data is not "11" which represents "copy-protected" and "temporal recording prohibited" at the step S43, the process goes to the step S44.

At the step S44, it is determined whether the digital copy regulation data is "10" (single authorized copy permitted and also a temporal recording is permitted) or not. If the digital copy regulation data is "10", a copy generation regulating process is executed at the step S45, and a recording process is executed at step S46.

Also, if it is determined that the digital copy control data is "11" in the step S43, it means that the recording is prohibited, as shown in FIG. 3, and the recording prohibiting process is executed in such a way that the intention is displayed on the OSD (On-Screen Display) at the step S47. The recording process is continued until the instruction for the recording prohibition is received.

Figure 5:
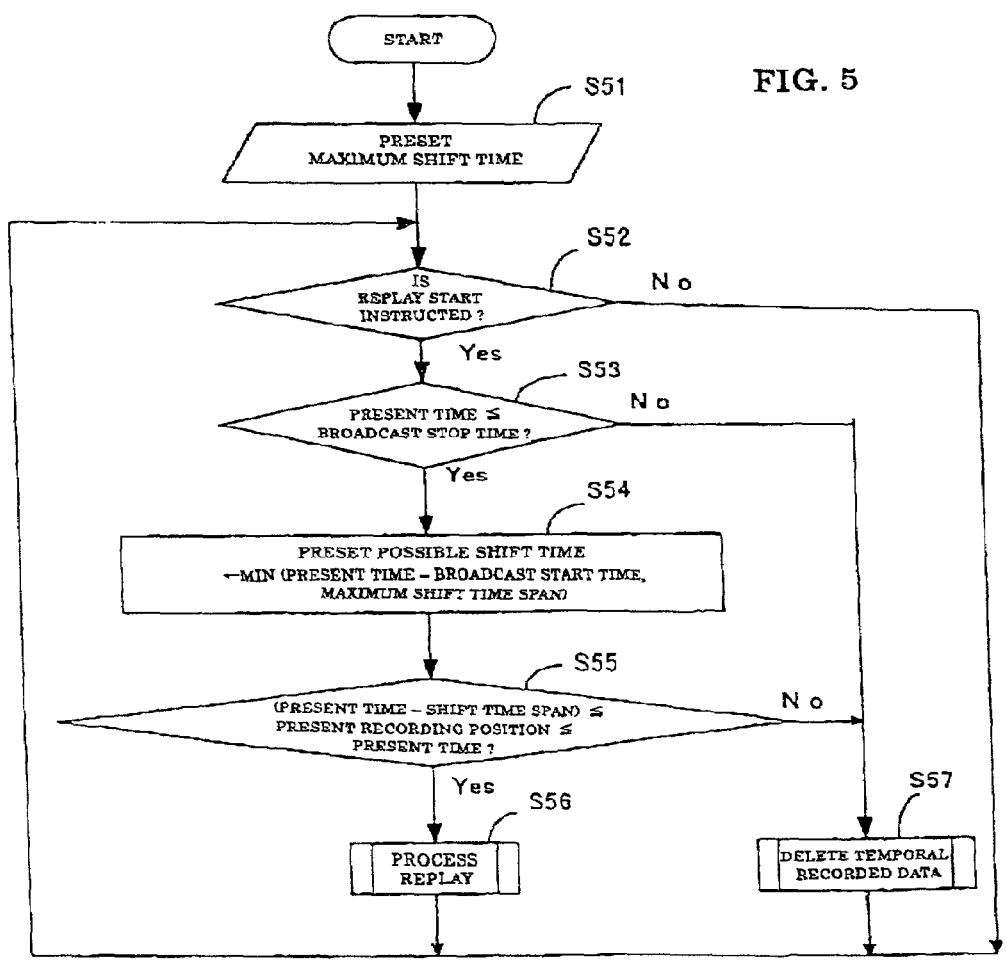
FIG. 5 is a flowchart for explaining the interpretation procedure for the replay control in accordance with an embodiment of the invention.

Now, the micro-controller 221 executes the control of the replay of the temporarily recorded program in the procedure shown in FIG. 5. At first, a maximum shift time Smax is preset at the step S51 between the transmitting and receiving devices in advance. When the instruction for replay start is received at the step S52, the present time and the program broadcast stop time are compared to each other at the step S53.

At step S53, if it is determined that the present time has not yet reached the program broadcast stop time. The process goes to step S54 and the time shift span Ts, namely "difference between present time and program broadcast start time" and "maximum shift time" are compared to each other and the smaller value is taken up.

For example, provided that the maximum shift time is 30 minutes and a certain program has been started and it is now 9:40, a difference between the present time and the program broadcast start time, that is, the program broadcast elapsed time is 40 minutes, therefore the maximum shift time is shorter, the time shift span Ts becomes 30 minutes.

Now, the process goes to the step S55 and it is determined whether the present replay position is more than the "difference between present time and time shift span" and less than the present time or not. In other words, the program can be replayed in the range from 9:10 PM to 9:40 PM. Accordingly, the process goes to the step S56 and wherein the time shift TV replay is executed from 9:10.

On the other hand, at the step S53, if it is determined that the present time has passed the program broadcast stop time, as the broadcasting has already ended, a temporal recording is not executed and then the temporal recorded data is deleted at the step S57.

As described above, the replay and the control of the temporarily recorded data can be executed in the receiver according to the temporal record control data by transferring the same on the program sequence data, i.e., a digital copy regulation descriptor.

In this embodiment, the program sequence data transmitted together with the program of the normal digital broadcasts are used as the data for the temporal record control, and it is not necessary to add a new signal.

Second Embodiment

In the embodiment, the temporal recording means the case that the replay starts before the recording ends. However, a temporal recording can be understood not only as such a ease but also the case that the replay expiry time is set and the replay is executed before the replay expiry time. Now, the case that the temporal recording permission/prohibition data is transmitted according to the limited reception related data according to such an embodiment, will be described. In other words, the temporal recording permission/prohibition data is transmitted by utilizing the limited reception related data from the transmitter, the program permitted for a temporal recording is limited for the use in the receiver by means of the replay expiry time.

Figure 6:
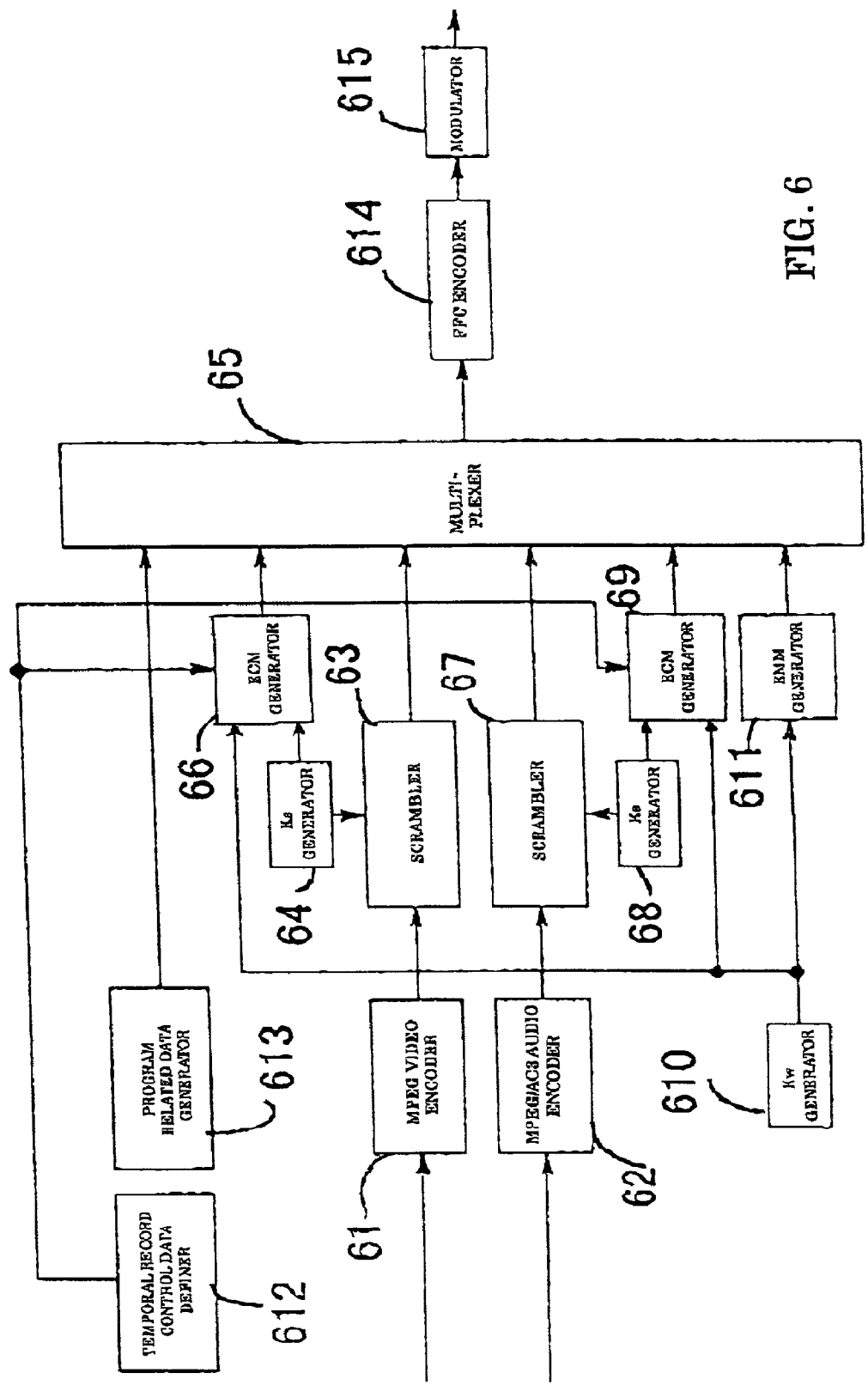
FIG. 6 is a block diagram showing the constitution of a transmitter in accordance with another embodiment of the invention.

An example for the basic configurations of the transmitter according to the embodiment is shown in FIG. 6.

The temporal record control data which is defined in the temporal record control data definer 612 is supplied to the ECM generators 66 and 69, is the only a difference from the embodiment shown in FIG. 1. At the ECM generators 66, 69, video record control data of one bite including the temporal record control together with an encrypted scramble key, as shown in FIG. 7 are generated and then supplied to the multiplexer 65.

Meantime, in this example, the temporal record control data which are defined in the temporal record control data definer 612 are not supplied to the program related data generator 613, but the temporal record control data of the program may be appropriately set into the ECM and the program sequence data respectively.

Also, the basic configuration of the receiver is similar to the FIG. 2 of the-mentioned first embodiment. The ECM is demultiplexed in the transport processor 25 together with an EMM and are as common data and individual data supplied to the IC card (not shown) inserted into the receiver. In the IC card (not shown), the encrypted work-key and scramble-key are decoded, and then loaded in the descrambler 23 and enables the descrambling process for video and audio.

Figure 8:
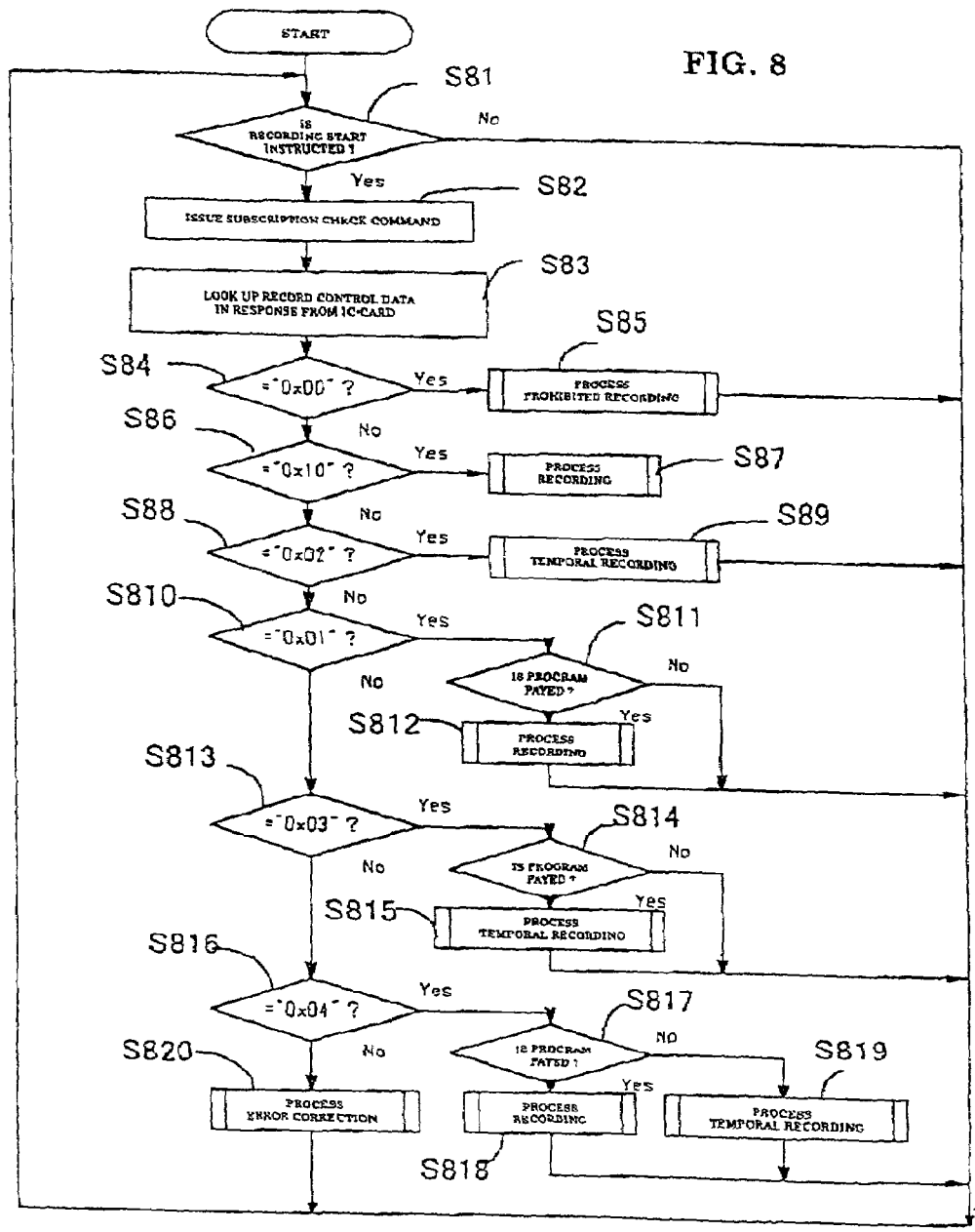
FIG. 8 is a flowchart for explaining the interpretation procedure of the record control in accordance with another embodiment of the invention.

The procedure for the record control in this embodiment is shown in FIG. 8. At first, if it is determined that the instruction of the recording start is received at the step S81, a subscription checking command is issued according to the ECM reception at the step S82. Now, a response is received from the IC card at the step S83 and looks up the video record control data.

At the step S84, if it is determined that the value of the video record control data is "0x00", as it means that the video recording is prohibited from FIG. 7, the process goes to the step S85 and executes a process for prohibiting recording in such a way that a message presenting that recording is prohibited is displayed on the display.

At the step S84, if it is determined that the value of the video record control data is not "0x00", the process goes to the step S86 and it is determined whether or not it is "0x10". If the value of the video control data is "0x10" at the step S86, as it means that the video recording is permitted, the process goes to the step S87 and the recording process is executed.

At the step S86, if it is determined that the value of the video record control data is not "0x10", the process goes to the step S88, wherein it is determined whether or not it is "0x02". If the value of the video record control data is "0x02" at the step s88, as it means the temporal video recording is permitted according to FIG. 7, the process goes to the step S89 wherein the temporal recording is executed.

At the step S88, if it is determined that the value of the video record control is not "0x20", the process goes to the step S810 and it is determined whether or not it is "0x01." If the value of the video record control data is "0x01", the recording is permitted only for subscribers, as shown in FIG. 7. Then, the process goes to the step S811 where a determination about paying to appropriate programs and its entry are relegate to viewers through the OSD.

At the step S811, if it is determined that the TV-viewer inputs that he pays for the program, the process goes to the step S812 wherein the recording process is executed. If the TV-viewer does not agree to pay for the program, the recording process is not executed.

At the step S810, if it is determined that the value of the video record control data is not "0x01", the process goes to the step S813, and it is determined whether or not it is "0×02". If the value of the video record control data is "0×03", the process goes to the step S814 and it allows the TV-viewer to select through the OSD whether he wishes to pay or not to pay for the program on the OSD display. If the TV-viewer pays for the program, it executes the temporal recording process at the step S815. If the TV-viewer did not pay for the program, the recording process is not executed.

On the other hand, if it is determined that the value of the video record control data is not "0×03" at the step S813, the process goes to the step S816, and it is determined whether or not it is "0×04". If the value of the video record control data is "0×04", as it means that the video recording is permitted for the subscriber only, as shown in FIG. 7 and the temporal video recording is also permitted, the process goes to the step S817 and allows the TV-viewer to select through the OSD whether he wishes to pay or not to pay for the program.

When the TV-viewer inputs that he pays for the program at the step S817, the process goes to the step S818 and wherein it is executed the recording process. When he did not pay for the program, the temporal video recording is permitted, the process goes to step S819 and wherein it is executed the temporal recording process. At the step S816, if it is determined that the value of the video record control data is not "0×04", it does not correspond to either of the cases, as shown in FIG. 7, the process goes to step S820 and executes the predetermined error correction process.

Figure 9:
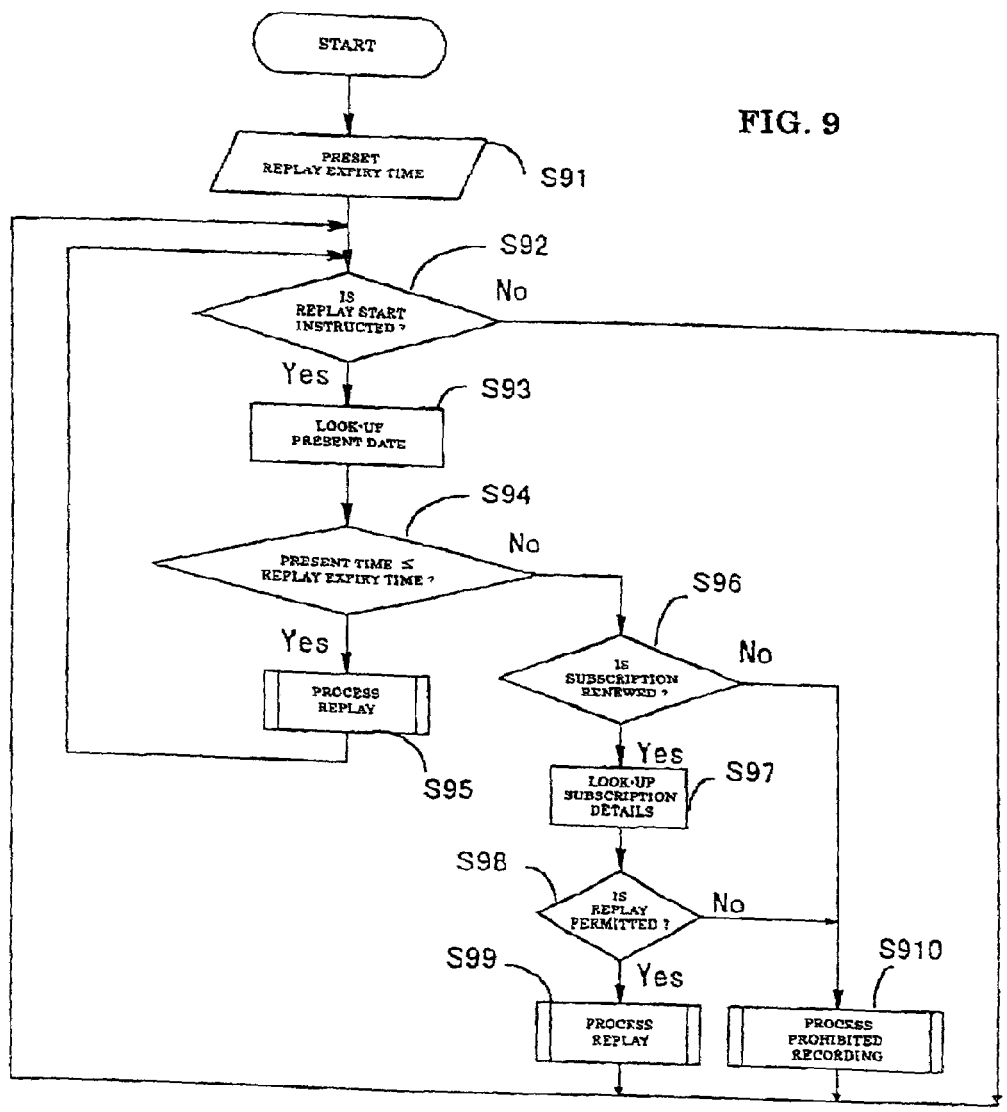
FIG. 9 is a flowchart for explaining the interpretation procedure of the replay control in accordance with another embodiment of the invention.

Now, the procedure of the replay control process in this embodiment will be described in reference to FIG. 9. At first, at the step S91, the replay expiry time is preset to both of the transmitter and the receiver. At the step S92, if it is determined that the instruction for the replay start is received, the process goes to the step S93 and it is determined, by looking up the present data, whether or not the present date as reached the replay expiry time at the next step S94

At the step S94, if it is determined that it is checked that the present date has not passed the replay expiry time, the process goes to the step S95 and the replay process is executed. On the other hand, if it is determined that it is found that the present date has passed the replay expiry time at the step 94, the process goes to the step S96 and it is checked whether or not the TV-viewer has renewed the subscription for TV replay. When the renewal of the subscription is checked at the step S96, the process goes to the step S97 and the subscription details are looked up.

It is checked whether or not the replay is permitted at the step S98 by looking up the subscription details at the step S97. When it is checked that the replay is permitted, the process goes to the step S99 and the replay process is executed.

When it is checked that the replay is not permitted at the step S98, and if it is determined that it is checked that the subscription is not renewed by the TV-viewer at the step S96, in the both cases the process goes to the step S910 and "the replay is not permitted" is executed in such a way by displaying that the replay is not permitted.

As described above in relation to the embodiment, the temporal record control data are transmitted from the transmitter by writing in the limited reception related data. Thus the replay of the temporarily recorded program can be executed according to the temporal record control data which are included in the limited reception related data in the receiver.

Also, it is possible to define that the temporal recording is a TV replay, which does not exceeds the replay expiry time. Meanwhile, it is also possible to have the temporal recording program, or which replay has been once prohibited due to the exceeding the limitation made available for playback by revising the TV replay subscription.

Third Embodiment

It is also possible to define the temporal recording as that the maximum number of replays is to be less than a predetermined value. On the other hand, the temporal record control data can be transmitted independently.

In this embodiment, descriptors are newly defined in the program sequence data and the temporal record control data are transmitted from the transmitter, and in the receiver the replay is prohibited when the number of past replays of the programs permitted for the temporal recording has exceeded a predetermined value in the receiver.

The constitution of the transmitter and the receiver is similar to those of FIGS. 1 and 2 of the respective embodiments.

On the transmitter side, in the program related data generator 113 according to the output from the temporal record control data definer 112, descriptors, as shown in FIGS. 10a, 10b and 10c are defined.

The prepared descriptors are mentioned on the corresponding tables such as the PMT or the EIT, and are supplied to the multiplexer 15. The newly defined descriptors are named the temporal record control descriptors.

Now, the "temporal_digital_recordability_flag", as shown in FIG. 10a represents whether or not a temporal recording is permitted. For example, as shown in FIG. 10b, when the one bit is "0", a temporal recording is not permitted and when it is "1", the temporal recording is permitted.

The "num_of_replay" field, as shown in FIG. 10a, represents the maximum number of replays (0 to 15) which is preset in the transmitter, when a program in interest has been temporarily recorded.

The "over_process_control" field, as shown in FIG. 10a, is also defined in the transmitter for handling a process when the temporal recording program has exceeded the "num_of_ replay" value specified as described before. And, as shown in FIG. 10c, when the value is "010", it means that the replay of the temporarily recorded program is limited in time. Therefore, in this case, the replay is limited in time, and parameters, as shown in FIG. 11, are provided.

Figure 11:
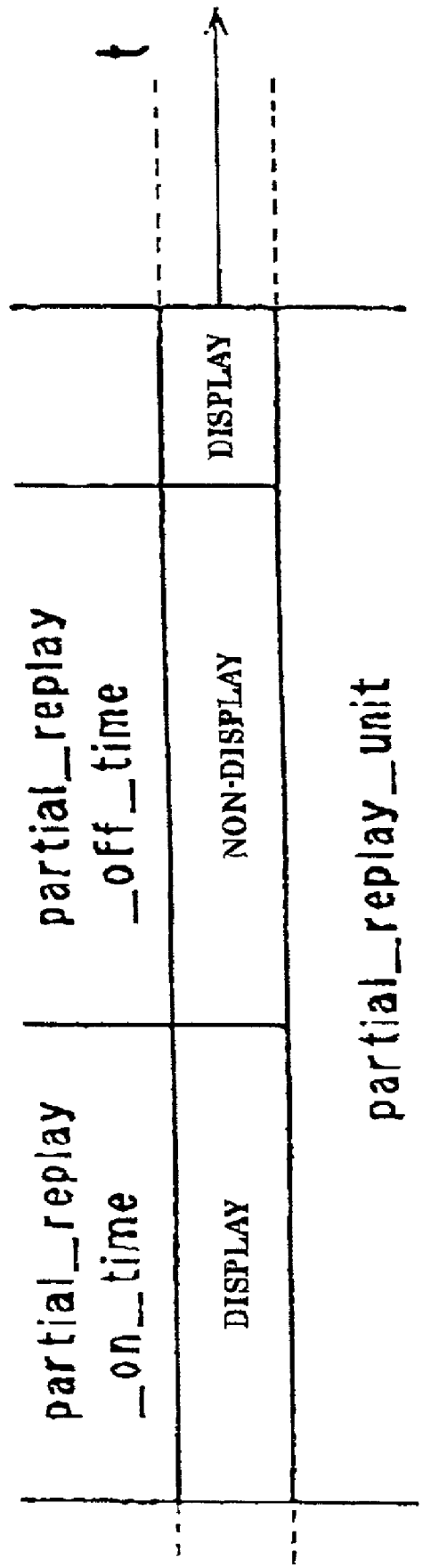
FIG. 11 is a time-chart for explaining a partial replay in time in accordance with still another embodiment of the invention.
Figure 12:
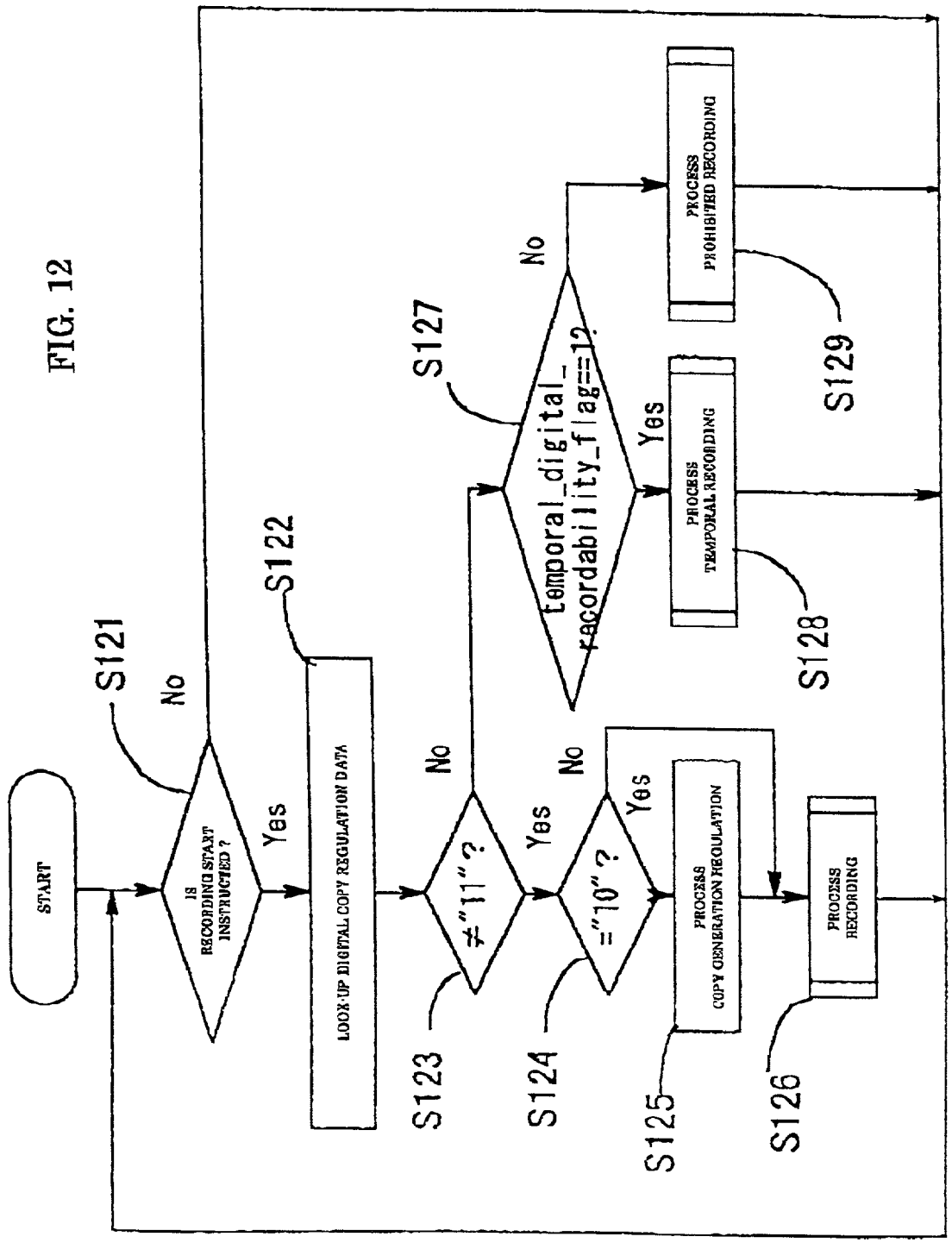
FIG. 12 is a flowchart for explaining the interpretation procedure of the record control in accordance with still another embodiment of the invention.

In FIG. 11, "partial_replay_unit" is a unit for the partial replay from the beginning of the program start of the temporal recording program and the period is repeated till the end of the program. Now, "partial_replay_on_time" is to define the indicative time within the period of the "partial_ replay_unit", and "partial_replay_off_time" is to define the non-indicative time following thereafter.

On the other hand, at the receiver, the program related data including the temporal record control descriptor are replayed, analyzed and record-controlled by the program related data regenerator 29, as shown in FIG. 2. This procedure will be described in reference to FIG. 12. The digital copy regulation data in this case is determined according to FIG. 3 except the case of "11".

At first, if it is determined that the instruction for the recording is received at the step S121, a digital copy regulation data described in the digital copy regulation is looked up at the step S122.

At the step S123, it is checked whether or not the value of the digital copy regulation data is "11". If the value of the digital copy regulation data is not "11" at the step S123, which means that copying is prohibited, the process goes to the step S124 and it is checked whether or not the value is "10".

At the step S124, if it is determined that the value of the digital copy regulation data is "10", as it means that a copying in one generation only is allowed, as shown in FIG. 3, a copy generation regulating process is executed at the step S125 and a recording process is executed at the step S126. On the other hand, if it is determined that the value of the digital copy regulation data is "11" at the step S123, the temporal record control descriptor "temporal_digital_recordability_flag", as shown in FIG. 10a is checked at the step S127.

If the "temporal_digital_recordability_flag" is "1" at the step S127, the process goes to step 128 and the temporal recording process is executed.

If the "temporal_digital_recordability_flag" is not "1" at the step S127, the process goes to the step S129 and the recording prohibiting process is executed in such a way that a message "recording is not allowed" is displayed on the screen. In the meantime, the routine for the recording process is continued until it receives the instruction for the stoppage of the recording.

Figure 13:
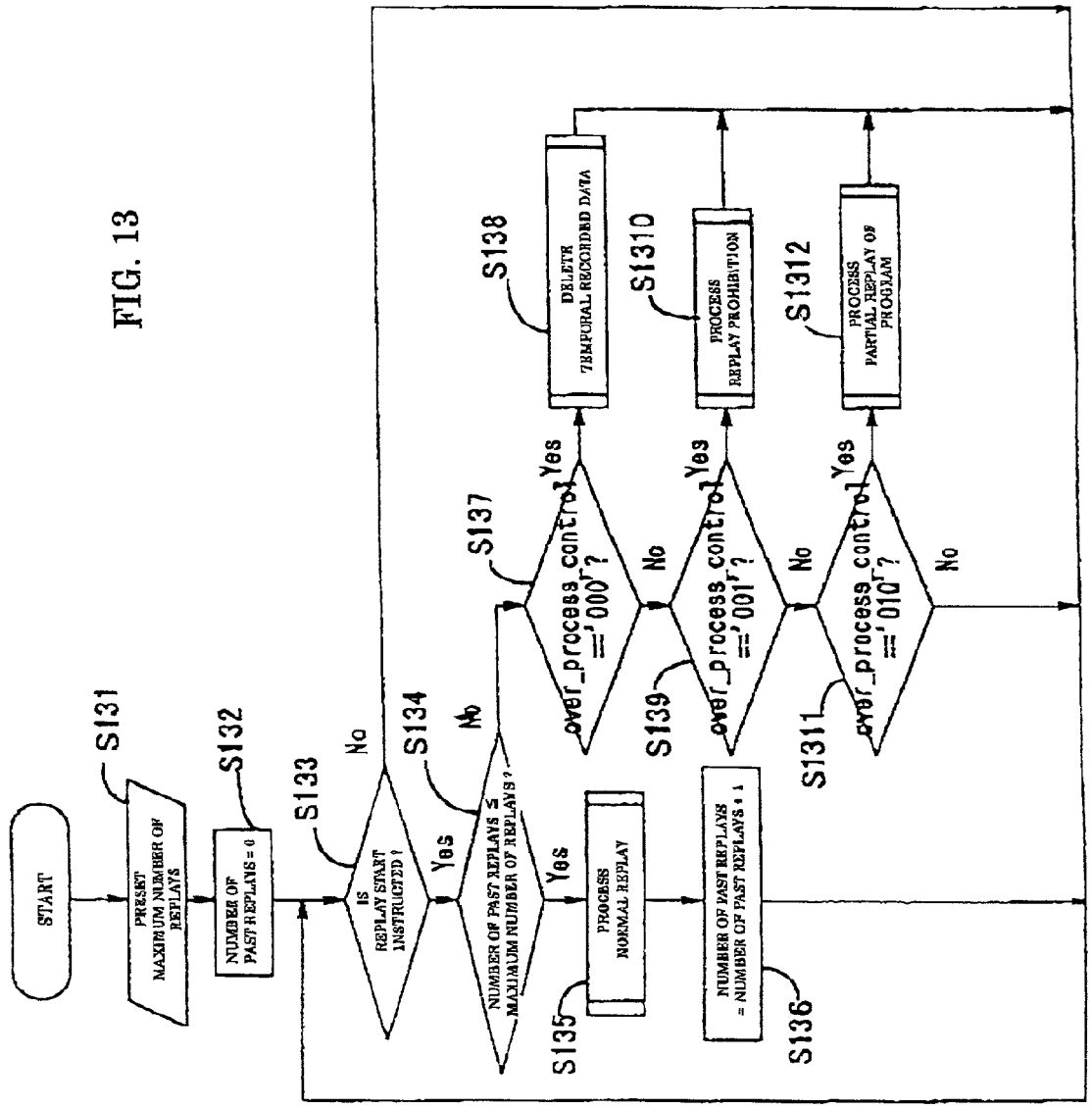
FIG. 13 is a flowchart for explaining the interpretation procedure of the replay control in accordance with still another embodiment of the invention.
Figure 17:
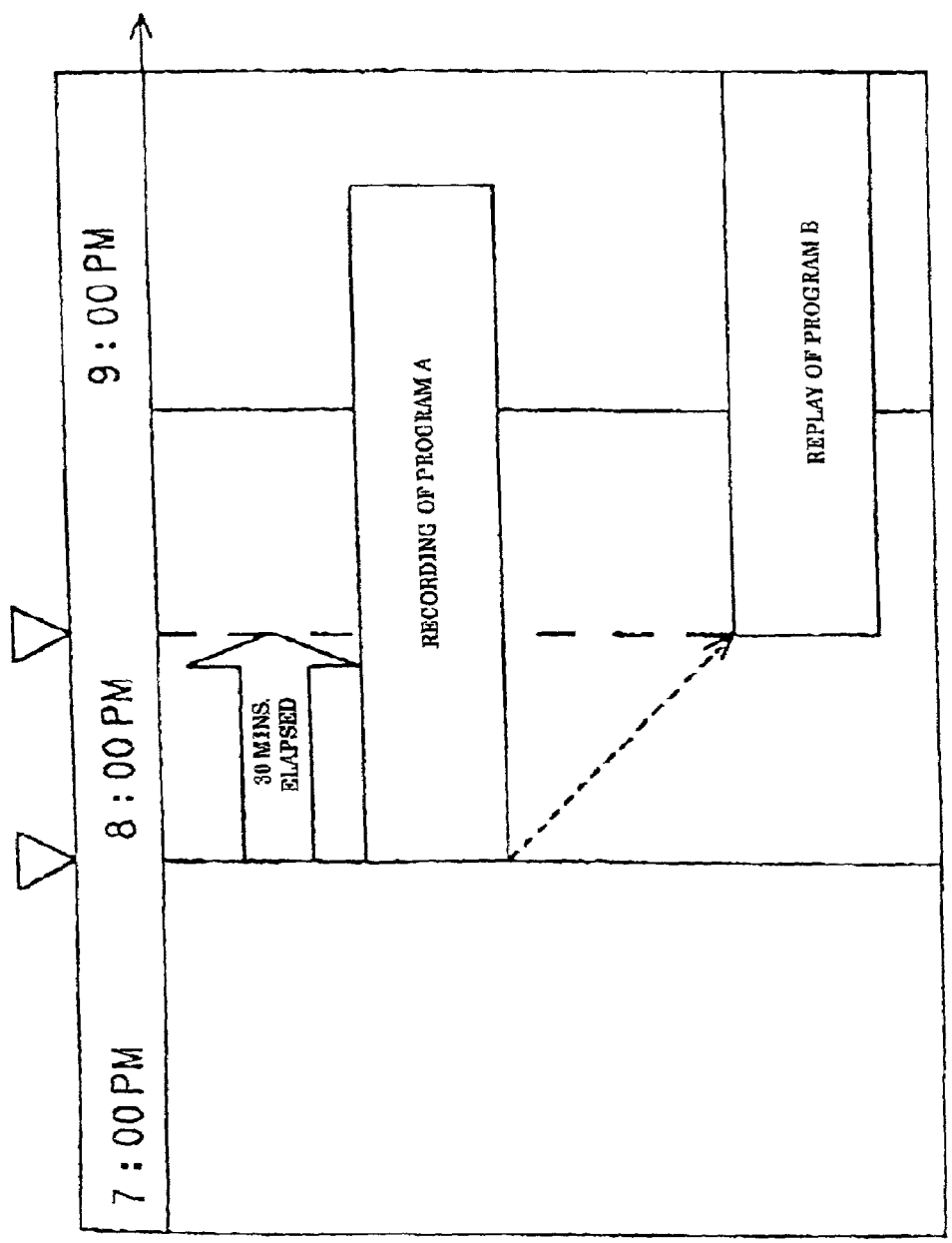
FIG. 17 is a time-chart for explaining the time shift TV replay in prior arts.

Now, the procedure for the replay control in the case of temporal recording will be described in reference to FIG. 13.

At first, at the step S131, maximum number of replays specified in the "num_of_replay" field of the temporal record control descriptor is preset, while the number of past replays value is reset to zero at the step S132.

If the instruction for the replay start is received at the step S133, the process goes to the step S134 and the number of past replays RN and the maximum number of replays RNmax are compared with each other. If it is determined that the number of past replays RN is less than the maximum number of replays RNmax at the step S134, the process goes to the step 135 and the normal replay process is executed. Then the process goes to the step S136 and the number of past replays RN is incremented.

At the step S134, if it is determined that the number of replay RN exceeds the maximum number of replays RNmax, the process goes to the step S137 and it is checked whether or not the "over_process_control" field value is "000".

At the step S137, if it is determined that the "over_process_control" field value is "000", as it means the "deletion of the temporal recorded program data" according to FIG. 10c and therefore the process goes to the step S138 and the temporal recorded data are deleted.

On the other hand, at the step S137, if it is determined that the "over_process_control" field value is not "000", the process goes to the step S139 and it is checked whether or not the value is "001". At the step S139, if it is determined that the "over_process_control" field value is "001", it means "replay of temporal recorded program is prohibited" from FIG. 10c, and therefore the process goes to the step S1310 wherein the replay prohibition process is executed.

At the step S139, if it is determined that the "over_process_control" field value is not "001", the process goes to the step S1311 and it is checked whether or not the "over_process_control" field value is "010".

At the step S1311, if it is determined that the "over_process_control" field value is "010", as it means that replay of the temporal recorded program is limited in time, and therefore, at the step S1312, a partial replay of the program is executed according to the parameters, as shown in FIG. 11, and a quality limitation of replay is accomplished. In other words, the picture is replayed intermittently so as to raise the TV-viewer's interest to subscribe the entire program.

In this embodiment although a partial replay in time has been explained as an example, it is also possible to spatially limit a replay. That is, only a portion of the picture can be displayed, or a resolution of the picture is so limited that the picture may be replayed blurry.

In this embodiment, temporal record control data are transmitted from transmitters, by adding a descriptor defining the control data into the program sequence data, and the replay control of the temporarily recorded program can be executed in receivers according to the descriptor. In this embodiment, when the maximum number of replays has exceeded a limitation, a quality of replay may be limited.

As described above, a temporal recording can be defined as a replay from the point of time before the recording ends; a replay before the replay expiry time; or the number of past replays is less than the predetermined value. Also, the temporal record control data can be transmitted, while the meaning is added in addition to the data for control regarding the digital broadcasts program recording; and also while meaning is added in addition to the data for control regarding the digital broadcasts received with limitation; or can be transmitted independently as the record control data for a temporal recording. This transmitting method of the temporal record control data and the aforementioned definition of the temporal recording can be completely independently selected. Normally, in what case a temporal recording is executed, can be agreed upon in advance between the transmitter and the receiver; or such a definition can be transmitted from the transmitter to the receiver in advance of the control data. Also in case the temporal record control data is not transmitted, how interpretation shall be made, can be agreed upon in advance.

According to the invention, a transmitter of digital broadcasts with which an appropriate copy regulation can be executed for a temporal recording, and its receiving method and a receiver are provided. Therefore, functions such as time shift TV replay at the receiver, can be easily accomplished in many programs, while the intention of the contents-provider is reflected.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A digital transmitter, comprising:
an encoder configured to encode a digital broadcast program:
a first definer configured to define copy generation control information;
a second definer configured to define retroactive view control information;
a multiplexer configured to multiplex the digital broadcast program decoded by the encoder with the copy generation control information defined by the first definer and the retroactive view control information defined by the second definer; and
a transmitter configured to transmit a signal multiplexed by the multiplexer,
wherein the copy generation control information specifies one of the copy modes of "copy-freely", "copy-once" and "copy-protected",
and wherein the retroactive view control information specifies a predetermined length time frame and allows a retroactive view operation by making a determination that a difference between a present time and a program start time is less than the predetermined length time frame, even if the transmitted copy generation control information is in the "copy-protected" mode.

2. A digital broadcast transmitter according to claim 1, wherein
the encoder sequentially encode a digital broadcast program, and
a sequencing data for sequencing digital broadcast program is transmitted through the transmitter in connection with the copy generation control information.

3. A digital broadcast transmitter as claimed in claim 2, wherein said sequencing data is either of a PMT (Program Map Table), an EIT (Event Information Table) and an SDT (Service Definition Table).

4. A method for receiving a digital broadcast program comprising:
receiving a multiplexed broadcast signal including at least a digital broadcast program, copy generation control information specifying any one of copy modes of "copy-freely", "copy-once" and "copy protected" and retroactive view control information comprising a predetermined length time frame;
demultiplexing the broadcast program, the copy generation control information from the received multiplexed broadcast signal and the retroactive view control information; and
controlling copy generation of the received demultiplexed digital broadcast program in accordance with the demultiplexed copy generation control information, and the retroactive view control information allowing a retroactive view operation by making a determination that a difference between a present time and a program start time is less than the predetermined length time frame, even if the transmitted copy generation control information is in the "copy-protected" mode.

5. A digital broadcast receiver, comprising:
a receiver configured to receive multiplexed broadcast signals including at least a digital broadcast program, copy generation control information specifying any of "copy-freely", "copy-once" and "copy-protected" and retroactive view control information specifying a predetermined length time frame;
a demultiplexer configured to demultiplex the broadcast program, the copy generation control information and the retroactive view control information from the received multiplexed broadcast signal; and
a controller configured to control copy generation of the received digital broadcast program in accordance with the copy generation control information, and the retroactive view control information allowing a retroactive view operation by making a determination that a difference between a present time and a program start time is less than the predetermined length time frame, even if the transmitted copy generation control information is in the "copy-protected" mode.

6. A digital broadcast receiver according to claim 5, further comprising a recording device for recording the received broadcast program.

7. A digital broadcast receiver according to claim 5, wherein a copy generation of the broadcast program is executed depending on whether a replay request is directed or not before a termination of recording operations.

8. A digital broadcast receiver according to claim 5, wherein a copy generation of the broadcast program is executed depending on whether a replay request has been entered before a predetermined time or not.

9. A digital broadcast receiver according to claim 5, wherein a copy generation of the broadcast program is executed depending on whether the number of past replays is less than or more than a predetermined value.

10. A digital broadcast receiver, comprising:
a control data receiver configured to receive a multiplexed broadcast signal including at least a digital broadcast program, retroactive view control information specifying a predetermined length time frame, and copy generation control specifying any of copy-modes of "copy-freely", "copy-once" and "copy-protected";
a demultiplexer configured to demultiplex the broadcast program and the copy generation control information from the received multiplexed broadcast signal;
a controller for controlling retroactive view of the received digital broadcast program in accordance with the retroactive view control information and the copy generation control information allowing a retroactive view operation by making a determination that a difference between a present time and a program start time is less than the predetermined length time frame, even if the transmitted copy generation control information is in the "copy-protected" mode.

11. A digital broadcast receiver as claimed in claim 10,wherein said sequencing data is either of a PMT (Program Map Table), an EIT (Event Information Table) and an SDT (Service Definition Table).

12. A digital broadcast receiver, comprising:
a broadcast program receiver configured to receive a multiplexed broadcast including at least a digital broadcast program, temporal record data specifying a predetermined length time frame and copy generation control information specifying any one of copy-modes of "copy-freely", "copy-once" and "copy protected"
a demultiplexer configured to demultiplex the broadcast signal, the temporal record control data and the copy generation control data; and
a controller configured to control permission/prohibition of a recording of the received broadcast program in accordance with the temporal record control data and the copy generation control data demultiplexed by the demultiplexer.

13. A digital broadcast receiver, comprising:
receiving means configured to receive a digital broadcasting program including copy generation control information specifying any copy-modes of "copy-freely", "copy-once" and "copy-protected" and retroactive view control information specifying a predetermined length time frame;

recording means configured to record the broadcast program received by the program receiving means on a recording medium; and reproducing means configured to reproduce the recorded program within the time frame defined by the retroactive view control information, in case of the copy generation control information recorded on the recording medium specifying the copy mode of "copy protected".

14. A digital broadcast receiver as claimed in claim 13, further comprising:

erasing means configured to erase a portion of recorded program passed beyond the shifting time frame between a present time and a program start time from the recording medium.

15. A method of receiving digital broadcast, comprising:

receiving digital broadcasting program including copy generation control information specifying any one of copy-modes of "copy-freely", "copy-once" and "copy-protected" in association with the digital broadcast program, and retroactive view control information defining a predetermined length time frame allowing retroactive view of the program from the present;

recording the broadcast program received by the program receiving means on recording medium; and reproducing the recorded program retroactive within the time framed defined by the retroactive view control information, in case of the copy generation control information recorded on the recording medium specifying the copy mode of "copy-protected".

\* \* \* \* \*